US008848671B2

(12) United States Patent
Schwent et al.

(10) Patent No.: US 8,848,671 B2
(45) Date of Patent: Sep. 30, 2014

(54) APPARATUS AND METHOD OF USING CDMA ARCHITECTURE FOR 3GPP2 COMPLIANT TRANSCEIVERS

(75) Inventors: Dale G. Schwent, Schaumburg, IL (US); Gregory W. Chance, Mundelein, IL (US); Armin W. Klomsdorf, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 183 days.

(21) Appl. No.: 13/205,661

(22) Filed: Aug. 9, 2011

(65) Prior Publication Data
US 2013/0039346 A1   Feb. 14, 2013

(51) Int. Cl.
H04B 7/216 (2006.01)
H04B 1/40 (2006.01)
H04B 1/707 (2011.01)

(52) U.S. Cl.
CPC ............... H04B 1/406 (2013.01); H04B 1/707 (2013.01)
USPC ........... 370/335; 370/342; 375/143; 375/152; 375/343

(58) Field of Classification Search
None
See application file for complete search history.

(56) References Cited

U.S. PATENT DOCUMENTS

| | | | |
|---|---|---|---|
| 6,201,799 B1 * | 3/2001 | Huang et al. | 370/342 |
| 7,181,162 B2 * | 2/2007 | Chang et al. | 455/13.1 |
| 7,656,897 B2 | 2/2010 | Liu | |
| 7,764,594 B2 | 7/2010 | Walton et al. | |
| 8,401,108 B1 * | 3/2013 | Haddadin et al. | 375/295 |
| 2002/0118735 A1 * | 8/2002 | Kindred | 375/222 |
| 2002/0163982 A1 * | 11/2002 | Ferrario et al. | 375/347 |
| 2003/0021334 A1 * | 1/2003 | Levin et al. | 375/147 |
| 2007/0035432 A1 * | 2/2007 | Gulati et al. | 341/155 |
| 2007/0133477 A1 | 6/2007 | Ebert et al. | |
| 2007/0243839 A1 * | 10/2007 | Kostic | 455/132 |
| 2008/0002763 A1 * | 1/2008 | Wei et al. | 375/232 |
| 2008/0051134 A1 * | 2/2008 | Brobston et al. | 455/553.1 |
| 2008/0198902 A1 * | 8/2008 | Malladi | 375/134 |
| 2009/0098868 A1 * | 4/2009 | Cheng | 455/425 |
| 2009/0305790 A1 * | 12/2009 | Lu et al. | 463/42 |
| 2010/0056201 A1 | 3/2010 | Akamine et al. | |
| 2010/0158178 A1 | 6/2010 | Sobchak et al. | |
| 2011/0204934 A1 * | 8/2011 | Schmidt et al. | 327/155 |
| 2013/0322581 A1 * | 12/2013 | Piirainen et al. | 375/343 |

FOREIGN PATENT DOCUMENTS

| | | |
|---|---|---|
| EP | 2154788 A2 | 8/2009 |
| EP | 2216931 A2 | 8/2010 |
| WO | 02067450 A2 | 8/2002 |
| WO | 2010025564 A1 | 3/2010 |

OTHER PUBLICATIONS

Patent Cooperation Treaty, International Search Report and Written Opinion of the International Searching Authority for International Application No. PCT/US2012/048799, Dec. 3, 2012, 13 pages.

* cited by examiner

*Primary Examiner* — Jeffrey M Rutkowski
*Assistant Examiner* — Hardikkumar Patel
(74) *Attorney, Agent, or Firm* — Faegre Baker Daniels LLP

(57) ABSTRACT

A mobile device that operates in a wireless communication network is disclosed. The mobile device includes a transceiver that uses a first wireless communication technology, which can be Long Term Evolution (LTE) technology. The mobile device also includes a modem that coupled to the transceiver through a standard interface and uses a second wireless communication technology, which can be CDMA. The modem processes the received signal from the transceiver and processes a transmit signal for the transceiver. A first receiver first processing circuit has a matching filter to compensate for and resampling the received signal from the receiver so that that the received signal from the transceiver is compatible with the modem. A transmitter processing has a filter for resampling and adjusting a processed transmit signal for the transmitter.

20 Claims, 6 Drawing Sheets

APPARATUS AND METHOD OF USING CDMA ARCHITECTURE FOR 3GPP2 COMPLIANT TRANSCEIVERS

FIELD OF THE INVENTION

The present disclosure relates generally to the design of wireless communication transceivers and modems and, in particular, to a design to make a CDMA modem compatible with an LTE transceiver.

BACKGROUND

As to be expected, an optimal cellular user equipment includes the best baseband modem paired with the best radio frequency transceiver. This optimal configuration is possible by using a standard interface between the baseband modem and the RF transceiver. For example, MIPI DigRF interface standards are designed for this purpose.

Currently in the marketplace, there are no available transceivers that support 3GPP2 CDMA standards that also support MIPI DigRF interface standards. Instead of using the standard interface, the available RF transceivers use a combination of analog and proprietary digital interfaces that are used between the baseband modem and RF transceiver. On the other hand, there are RF transceivers that use DigRF interfaces, but these transceivers are designed for 3GPP LTE standards. Therefore it is necessary to modify the radio architecture of the modem so that it can be made compatible with the transceiver and take advantage of the standard interface.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
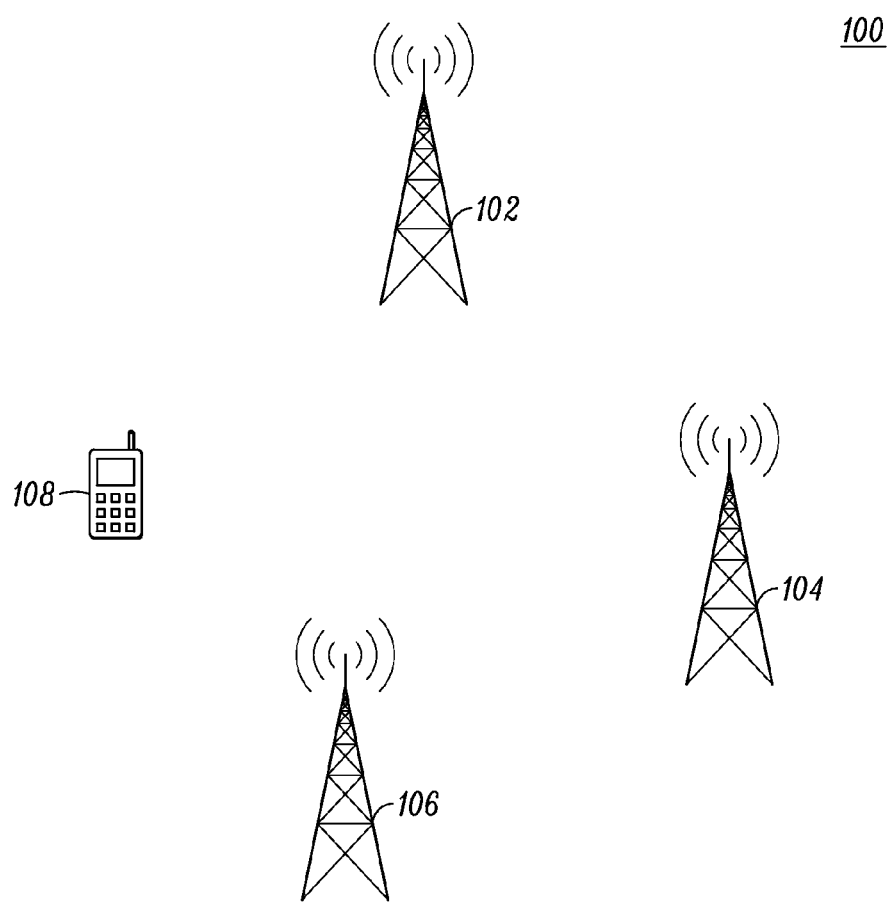
FIG. 1 is a block diagram of a wireless communication network in which some embodiments of the invention are implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and apparatus for using a Long Term Evolution transceiver with a 3GPP2 CDMA modem utilizing a standard interface. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an apparatus that includes a Long Term Evolution transceiver coupled to a 3GPP2 CDMA modem using a standard interface as described herein. The non-processor circuits may include, but are not limited to, a radio receiver, a radio transmitter, signal drivers, clock circuits, power source circuits, and user input devices. As such, these functions may be interpreted as steps of a method of using the Long Term Evolution transceiver coupled to the 3GPP2 CDMA modem by a standard interface. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present disclosure relates to an apparatus such as a mobile device that operates in a wireless communication network. The mobile device includes a transceiver that has a transmitter for transmitting a signal and a receiver for receiving a signal. The transceiver uses a first wireless communication technology, which can be Long Term Evolution (LTE) technology. The mobile device also includes a baseband modem that coupled to the transceiver through a standard interface and uses a second wireless communication technology. The modem processes the received signal from the transceiver and processes a transmit signal for the transceiver. The modem includes a first receiver processing circuit and a transmitter processing circuit. The first receiver processing circuit has a matching filter to compensate for differences between the LTE filtering of the receiver and the requirements of the CDMA modem received signal from the receiver so that that the received signal from the transceiver is compatible with the modem. The first receiver processing circuit can also resample the received signal so that it is compatible and optimized for use by the modem. The modem also includes a transmitter processing having a filter for resampling and adjusting a processed transmit signal for the transmitter. Thus, the signals are optimized for use by the transceiver and the baseband modem.

In an embodiment the modem also includes a second receiver first processing circuit having a second matching filter. The second receiver processing circuit compensates for and resamples the received signal from the receiver so that the received signal is compatible with the modem. The first receiving processing circuit processes the main received signal, and the second receiver processing circuit processes a diversity received signal. The first matching filter resamples the received signal from a rate of 1.92 MHz to 8× chip rate required by the modem and includes an interpolation filter that upsamples by a factor of 128 followed by a decimation filter that downsamples by a factor of 25. The modem and the transceiver described are configured so that a channel bandwidth to filtering bandwidth in the transceiver is greater than the channel bandwidth to filtering bandwidth implemented by the modem. In an embodiment, the channel bandwidth to filtering bandwidth in the transceiver approximates the channel bandwidth to filtering bandwidth implemented by the modem. In a particular embodiment, the channel bandwidth to filtering bandwidth in the transceiver provides rejection for at least one of aliases and noise so that the apparatus meets spectral emissions. The receiver processing circuit further includes an aliasing filter in order to process the received signal from the RF transceiver for the CDMA modem, and the transmit processing circuit further includes an aliasing filter in order to process the transmit signal from the CDMA modem for the transceiver.

This disclosure also is directed to a wireless communication device. The device includes an LTE radio frequency transceiver that has a receiver, a transmitter and an interface. The device also includes a CDMA baseband modem that has an interface coupled to the transceiver interface. The modem includes a first matching filter coupled between the modem interface and a first receiver processing circuit and pulse shaping filter coupled between the interface and a transmitter processing circuit. The matching filter compensates for the filtering from the LTE receiver and resamples the received signal from the LTE receiver to a rate compatible with the CDMA modem. The pulse shaping filter for resampling and adjusting a processed transmit signal from the CDMA modem for the LTE transmitter. Thus, the signals received are optimized for use by the LTE receiver and the CDMA modem.

The present disclosure also includes a method performed by a mobile device. The method receives a signal by a transceiver wherein the transceiver using a first wireless communication technology such as LTE wireless communication technology. The method provides the received signal to a modem that uses a second wireless communication technology, such as 3GPP2 CDMA wireless communication technology, and is coupled to the transceiver using a standard interface. The method filters the received signal to optimize the received signal for the second wireless communication technology by compensating for filtering of the received signal by the transceiver and resampling the received signal from the rate of the transceiver to the rate of the modem. The received signal is demodulated by the modem for use by the mobile device. In addition, the method includes modulating a signal for transmission using the second wireless communication technology. The method can resample the transmission signal to adjust the transmission signal from using the second wireless communication technology to using the first wireless communication technology as well as provide timing adjustments to the transmission signal for the first wireless communication technology. The method filters the transmission signal to provide pulse shaping for the first wireless communication technology and provides the transmission signal for the first wireless communication signal to the transceiver using the interface. Thus, the signals are optimized for use by the transceiver and the modem.

Turning to FIG. 1, a wireless communication network 100 is shown. The wireless communication network can be one of the known 3G or 4G wireless communication technologies and that includes Long Term Evolution (LTE), CDMA 2000 (cdma2000), wide-band CDMA (W-CDMA), Universal Mobile Telecommunication System (UMTS), High Speed Downlink Packet Access (HSDPA), WiFi (IEEE 802.11), WiMAX (IEEE 802.16) and other technologies. In addition, more advanced generations of wireless communication technologies are being developed such as LTE-Advanced. The wireless communication network 100 includes one or more access points, base stations or eNode Bs 102-106, collectively referred to as base stations. In a known manner according to the wireless communication technology used by a wireless carrier, the base station 102-106 are arranged and configured within the corresponding networks 102-106 to provide wireless communications to mobile devices 108. The mobile devices 108, which are described in more detail below, are designed to communicate with the base stations 102-106 and can be dual mode devices so that they are able to communicate in more than one networks. In addition, the wireless communication network 100 includes other various infrastructure components and equipment (not shown) so that the mobile devices 108 can communicate with the base stations 102-106 and will operate according the appropriate wireless communication technology used by the carrier.

Figure 2:
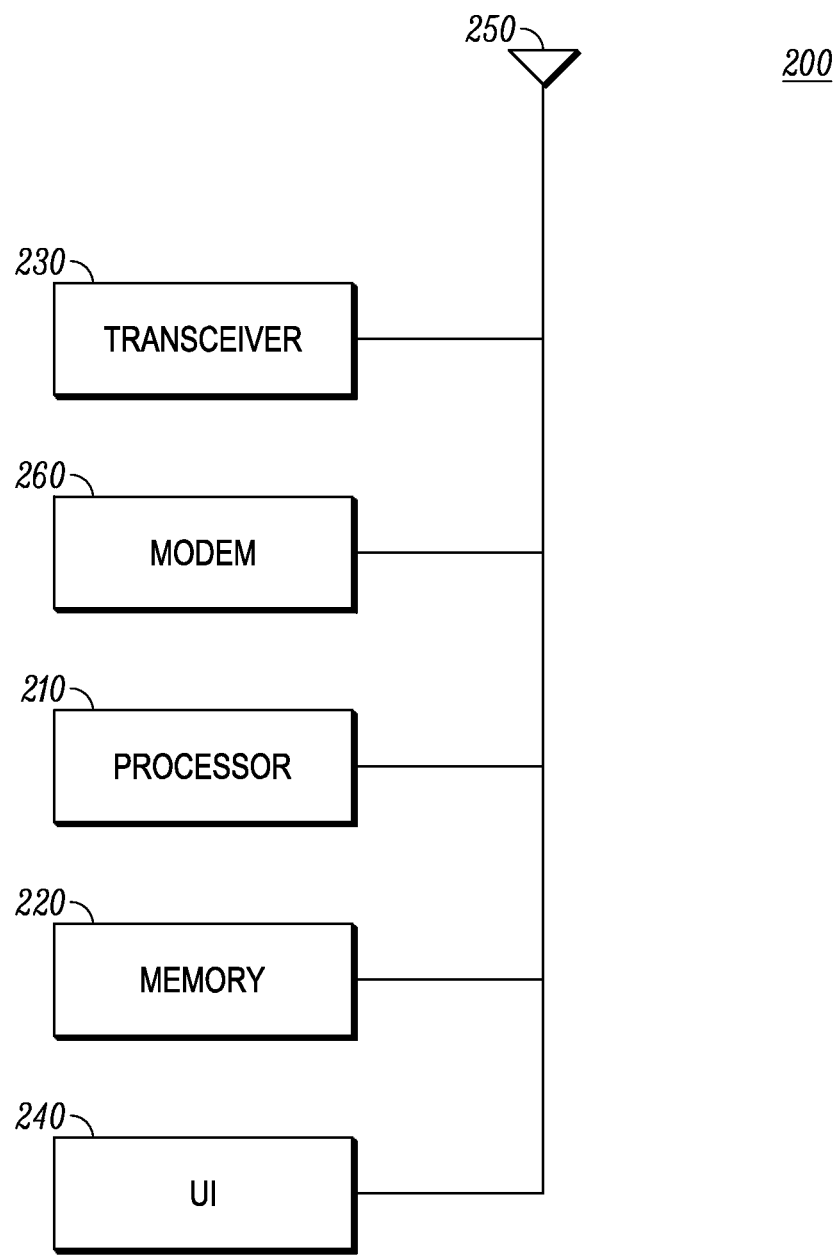
FIG. 2 is a block diagram of a mobile device in which some embodiments of the invention are implemented.

In FIG. 2, a mobile device 200, which corresponds to the mobile device 108, is shown. Mobile device 200 can be any of various types of device such as cell phones, smartphones, personal digital assistants and laptop, lapbook and tablet computing devices. The mobile device includes a controller/processor 210 communicably coupled to memory 220, a transceiver 230, user interface (UI) 240, antenna 250 and modem 260 which are coupled together via a system bus 270. Similar components are used as a part of base stations 102-106. The mobile device 200 can be a dual mode device and is therefore compliant with multiple protocols of the wireless communication system. Thus, mobile device can include multiple antennas and transceivers, while only one such component is shown, to operate in the multiple networks. In FIG. 2, the controller/processor 210 may be implemented as any programmed processor and may be configured to operate with the different antennas and transceivers for the different 3G networks or other networks. However, the functionality described herein may also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a programmable logic array, field programmable gate-array, or the like.

In FIG. 2, the memory 220 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The memory may be embedded with an ASIC that may include the baseband processor. Such memory is sometimes referred to as on-chip memory. Alternatively, the memory may be shared with other processors in the device such as an application or graphics processor, in which case the memory may be referred to as off-chip memory. The transceiver 230 and antenna 250 are capable of communicating by transmitting and receiving data with mobile devices 200 and base stations 102-106 pursuant to the wireless communication technology implemented. The modem 260 is used to modulate signals to be transmitted from the mobile device 200 by the transceiver and to demodulate signals received by the mobile device 200 by the transceiver. The modem 260 modulates and demodulates the signals according to the wireless communication technology utilized by the carrier operating the base stations 102-106 to which the mobile device 200 communicates. The UI 240 connects to one or more input devices that may include a keyboard, mouse, pen-operated touch screen or monitor, voice-recognition device, or any other device that accepts input. The UI may also connect to one or more output devices, such as a monitor, printer, disk drive, speakers, or any other device provided to output data. As can be appreciated, the base stations 102-106 are comparably equipped with the controller/processor 210 communicably coupled to memory 220, a transceiver 230, antenna 250 and modem 260, to operate in conjunction with the mobile device 108, 200 in a known manner according to the wireless communication network technology.

Figure 3:
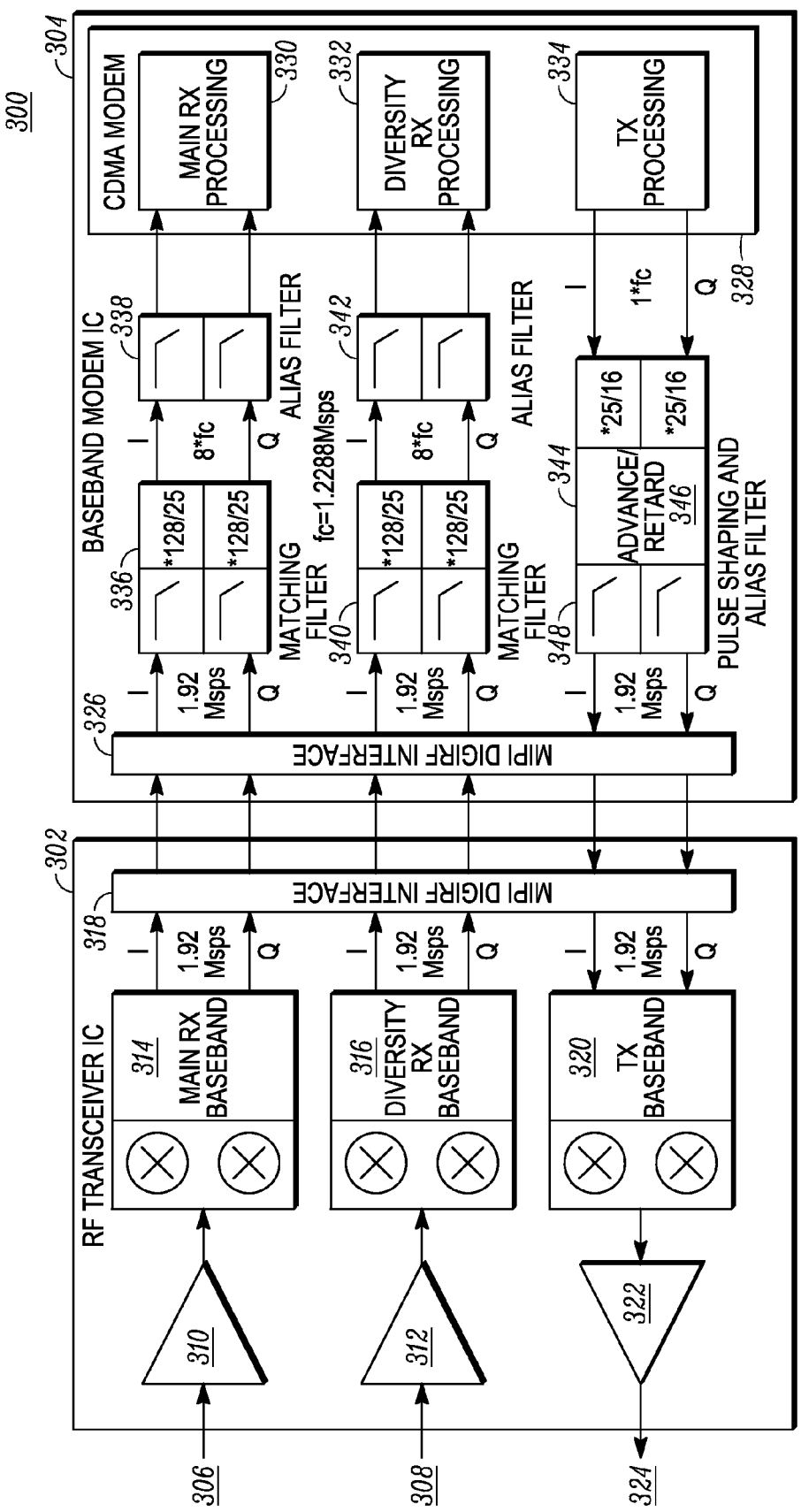
FIG. 3 is a block diagram of a radio frequency transceiver and a baseband modem used in accordance with some embodiments of the invention.

FIG. 3 is a block diagram 300 for an embodiment of a radio frequency (RF) transceiver integrated circuit (IC) 302, which corresponds to transceiver 230, that is coupled to a baseband modem IC 304, which corresponds to modem 260. The RF transceiver IC 302 may represent a typically commercially available LTE optimized transceiver. The baseband modem IC 304 may that includes a typically commercially available 3GPP2 CDMA formatted modem 328. The CDMA modem shown can generate baseband signals in a CDMA format conforming to one or both of 3GPP2 1xRTT or EV-DO formats. In either case those signals are processed at a 1.2288 Msps rate, or multiple thereof, with an occupied bandwidth of 1.48 MHz. As is understood, the RF transceiver IC 302 and the baseband modem IC 328 as commercially available are incompatible with one another due to various factors including the different sampling rates as well as the different filtering requirements between LTE and 3GPP2 CDMA wireless communication technology requirements. For example, the 3GPP2 transmitter requires a specific pulse shaping filter that is not generated by the LTE RF transceivers. There is also no provision for 3GPP2 compliant timing adjustments of the transmit signals. For the receiver, the 1.4 MHz bandwidth filtering used by LTE is generally too narrow to acceptably pass the 1.48 MHz bandwidth signal of the modem without excessive distortion. The baseband modem IC 304 is configured to compensate for the discrepancies between the modem and the RF transceiver IC 302.

As mentioned, the RF transceiver IC 304 is optimized to operate in an LTE wireless communication network 100. The transceiver receives a main signal 306 and a diversity signal 308 from at least one of the base station 102-106. The main and diversity signals 306 and 308 are amplified by amplifiers 310, 312, respectively. The amplifier 310 is coupled to a main baseband receiver 314, and amplifier 312 is coupled to a diversity baseband receiver 316. The main and diversity baseband receivers 314 and 316 calculate the digital I and Q components of the signals with an interface rate of 1.92 Msps. These components are provided to an interface 318 of the transceiver IC. The interface 318 is configured using specifications set by the MIPI Alliance RF baseband interfaces in mobile devices. The specifications describe the logical, electrical and timing characteristics of the digital RF to baseband interface for interactions and connections between transceivers and modems.

The RF transceiver also includes a baseband transmitter 320 that is coupled to the interface 318. In addition, the baseband transmitter 320 is connected to an amplifier 322 to produce a signal 324 that can be transmitted by the mobile device 108 using LTE wireless communication technology.

As mentioned, RF transceiver IC 302 is coupled to the baseband modem IC 304, which unlike the LTE wireless communication technology the transceiver is designed to utilize uses 3GPP2 CDMA technology. The baseband modem IC 304 also includes an interface 326, which like the interface 318, utilizes MIPI DigRF standards. The baseband modem IC 304 includes a CDMA modem 328, which includes a main receiver processing circuitry 330 as well as diversity receiver processing circuitry 332. The CDMA modem also includes a transmitter processing circuitry 334.

While the interfaces utilize the same standards to take the advantages that the MIPI DigRF standards provide, the baseband modem IC 304 is modified so that the signals using LTE wireless communication technology of the transceiver IC 302 are compatible for use with the CDMA modem 328. On the receiver end of the baseband modem IC 304, a first matching filter 336 is coupled to an aliasing filter 338. The first matching filter 336 and first aliasing filter 338 are coupled between the interface 326 and the main receiver processing circuitry 330. A second matching filter 340 and a second aliasing filter 342 are coupled together between the interface 326 and the diversity receiver circuitry 332. The first and second matching filters 336, 340 receive the I and Q components of the received signal from the interface 326 at the 1.92 Msps rate. The matching filters compensate for the inband response of the overly narrow filtering found in the receiver path of the transceiver IC's 302 baseband receivers 314, 316. In the receiver path provided by the matching filters 336, 340, the 1.92 MHz rate of the received signal provided by the transceiver is resampled to convert the signal to the desired CDMA rate of 8x. The alias filters 338, 342 remove spurious responses that occur at the outputs of the matching filters 336, 340. The alias filters 338, 342 preserve the receiver signal sensitivity in the presence of other signals and interference. In the receiver path, the signals received from the LTE transceiver are therefore optimized for use by the CDMA modem.

The modem utilizes transmission processing circuitry 334 to configure a signal to be transmitted from the mobile device 108 to the base stations 102-106. As the 3GPP2 CDMA baseband modem 304 is coupled to the LTE transceiver 302 using the standard interfaces 318, 326, the modem must also modify and configure the signal in a manner similar to the received signal so that the signal of the CDMA modem is compatible with and optimized for the LTE transceiver. In an embodiment, the modem 304 includes a pulse shaping filter 344 to resample and adjust the original 3GPP2 CDMA signal for the LTE transceiver. The pulse shaping filter 344 resamples and adjusts the 3GPP2 CDMA signal that operates at a rate of 1.2288 MHz to the 1.92 MHz rate of the LTE transceiver. The pulse shaping filter 344 can include an advance/ retard block 346 to provide timing adjustments to the original 3GPP2 CDMA signal. In addition, the pulse shaping filter can include an alias filter 348 component that removes spurious responses that are caused by the filter 344 to the transmit signal as well as preserve the transmit signal sensitivity in the presence of other signals and interference. The filtering provides the pulse shaping needs to create compliant error vector magnitude (EVM) performance. The EVM performance is a measure the modulation accuracy of how well the modem is transmitting the signal. In addition, the filter 344 provides filtering of the resampled outputs that would otherwise cause failures in the transmission.

Figure 4:
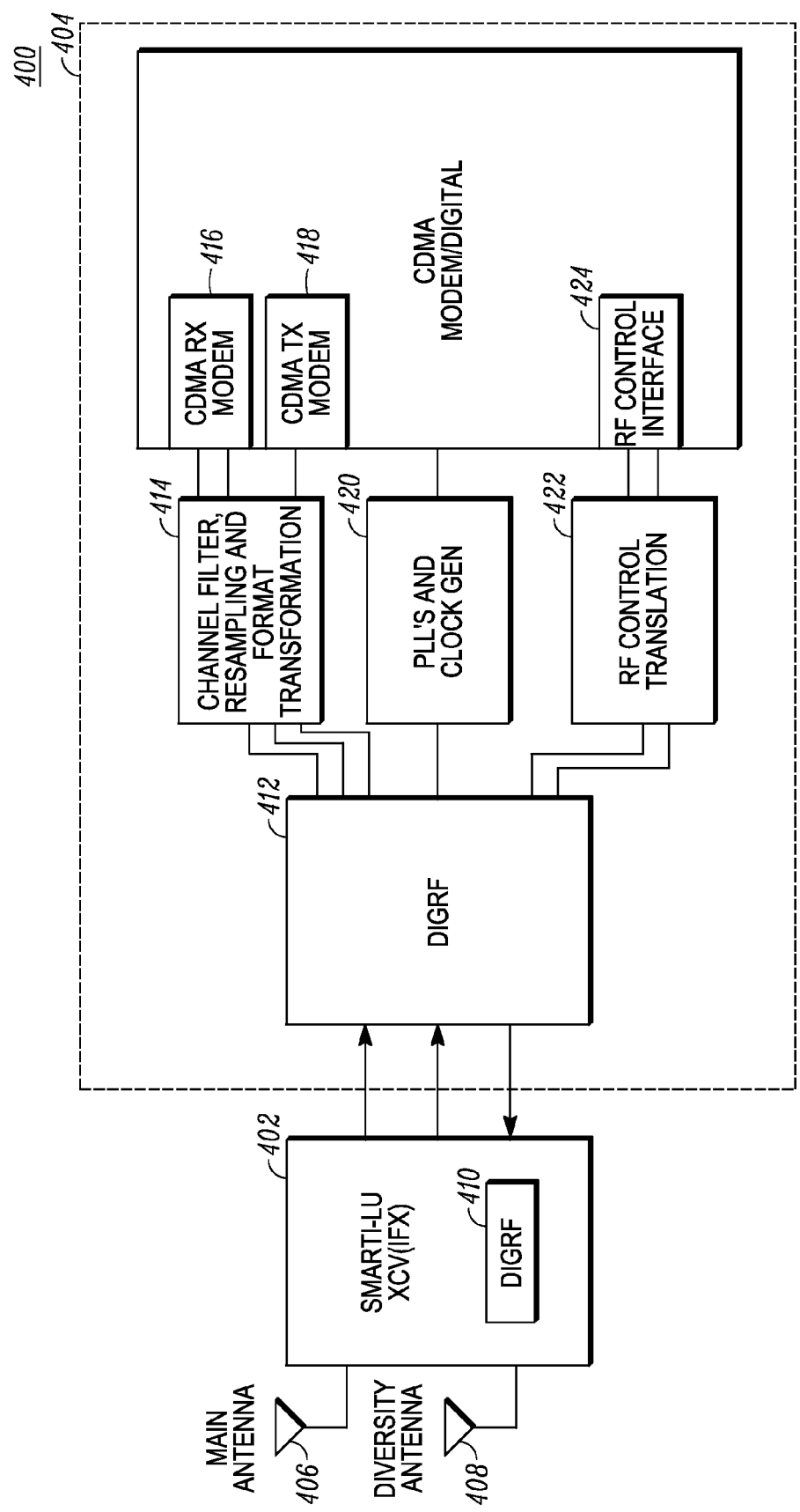
FIG. 4 is a block diagram of a radio frequency transceiver and a baseband modem used in accordance with some embodiments of the invention.

FIG. 4 is a block diagram 400 for another embodiment of a radio frequency (RF) transceiver integrated circuit (IC) 402, which corresponds to transceiver 230, that is coupled to a baseband modem IC 404, which corresponds to modem 260. The RF transceiver IC 402 may represent a typically commercially available transceiver that supports LTE transmissions. The baseband modem IC 404 may include a typically commercially available 3GPP2 CDMA formatted modem. The CDMA modem shown can generate baseband signals in a CDMA format conforming to one or both of 3GPP2 1×RTT or EV-DO formats.

The transceiver IC 402 is coupled to main antenna 406 and diversity antenna 408. The antennas and transceiver IC 402 receive and transmit signals for the mobile device 108 in known manners according the wireless communication technology of network 102, such as LTE. The transceiver includes an interface 410 that is used in the connection between the transceiver IC 402 and modem IC 404. As is understood, the interface 410 is formatted based on the MIPI DigRF standard, although other standards can be used.

The transceiver IC 402 is coupled to modem IC 404 using interface 412, which like interface 410 is formatted based on MIPI DigRF. As shown by the arrows between the transceiver IC 402 and modem IC 404, the transceiver IC 402 provides the modem IC 404 with main and diversity received signals, and the modem IC 404 provides the transceiver IC 402 with transmit signals.

The interface 410 supplies the received signals to channel filter 414. The channel filter provides resampling and format translation for the LTE signals received from the receive portion of transceiver IC 402 so that the received LTE signals are compatible with and optimized for the CDMA signals that are used by the modem IC 404. The resampled and format translated signals are provided to the CDMA receiver modem 416. As indicated, the channel filter 414 provides resampled and format translated signals for both the main and diversity received signals. In addition, the CDMA transmitter modem 418 provides signals that are to by transmitted by the mobile device to the channel filter 414, which resamples and format translates the CDMA signals so that the CDMA signals are compatible and optimized to be used by the LTE transceiver IC 402.

The interface 410 also provides phase lock loop and clock generation signals using block 420 between the transceiver IC 402 and the modem. In addition, interface 410 provides RF control translation information using RF controller 422 to an RF control interface 424 of the modem.

The additional functionality of the modem IC 404 provided by the channel filter 414 provides functions such as the matching filter and alias filter described in connection to FIG. 3. The channel filter also provides the fractional sample rate conversion described above.

Figure 5:
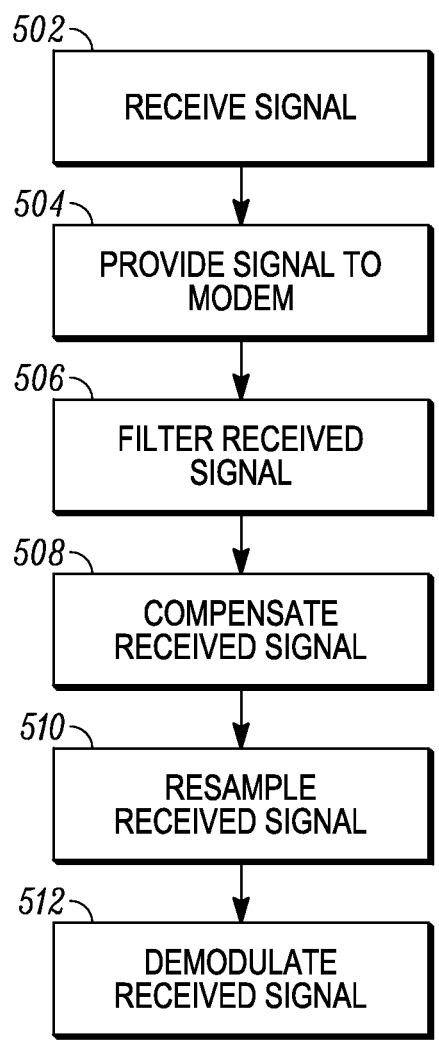
FIG. 5 is a flow chart showing the method of receiving a signal in accordance with some embodiments of the invention.

FIG. 5 is a flow chart illustrating a method of receiving a signal using a transceiver 302 that uses LTE wireless communication technology and a modem 304 that uses a 3GPP2 CDMA wireless communication technology where the transceiver and the modem are coupled together using a standard interface, e.g. MIPI DigRF. The method begins by the transceiver 302 receiving 502 a signal 306, 308. The transceiver 302 provides 504 the signal to the baseband modem 304 over the standard interfaces 318, 326. The modem filters 506 the received signal to optimize that signal so that it is compatible with the wireless communication technology used by the modem. As a part of the process of optimized the signal, the filters compensate 508 the received signal and resample 510 the received signal from the rate of the transceiver to the rate of the modem. The modem then demodulates 512 the received signal.

Figure 6:
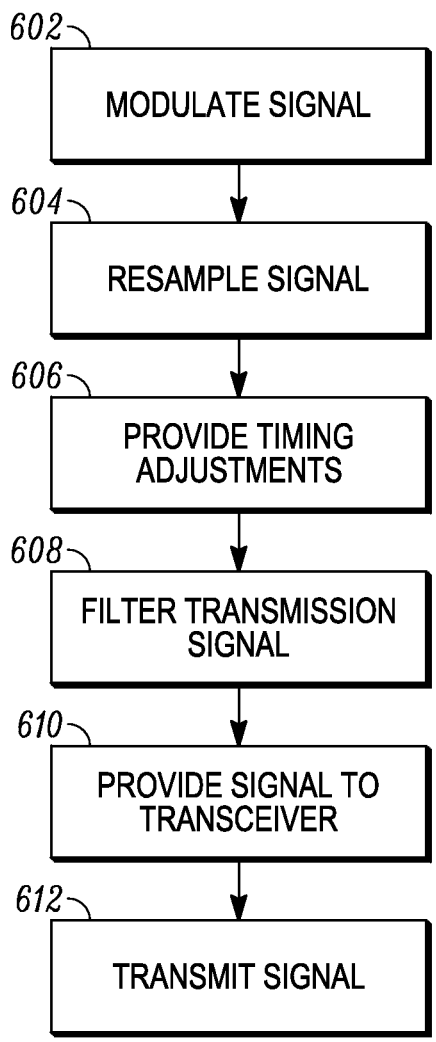
FIG. 6 is a flow chart showing the method of transmitting a signal in accordance with some embodiments of the invention.

FIG. 6 is a flow chart illustrating a method of transmitting a signal using a transceiver 302 that uses LTE wireless communication technology and a modem 304 that uses a 3GPP2 CDMA wireless communication technology where the transceiver and the modem are coupled together using a standard interface, e.g. MIPI DigRF. The method begins by modulating 602 the signal to be transmitted. The signal is then resampled 604 to adjust the transmission signal from using the 3GPP2 CDMA wireless communication technology so that the transmission signal is optimized to be compatible with the LTE wireless communication technology of the transceiver. The resampled signals provide 606 timing adjustments to the transmission signal for the first wireless communication technology. The resampled signals are also filtered 608 the transmission signal to provide pulse shaping for the LTE. The pulse shaped signals are provided 610 to the transceiver using the interface and are then transmitted 612 by the transceiver.

As understood in light of the foregoing, the RF transceiver IC 302 using a LTE wireless communication technology and baseband modem IC 304 using 3GPP2 CDMA wireless communication technology can be used in a mobile device 108 when the transceiver 302 and the modem 304 are coupled together using interfaces 318, 326 that are configured according to the same standard, e.g. MIPI DigRF. The baseband modem IC 304 is configured with matching filters 336, 340 and the pulse shaping filter 344 so that a more optimal pairing of baseband modem and RF transceiver can be achieved. The matching filters 336, 340 and pulse shaping filter 344 adjust the receive and transmit signals so that they are compatible for use by the modem and transceiver without significantly distorting the signals or degrading the various performance metrics required of the signals including receive and transmit EVM, receive spurious responses, transmit code domain error and transmit spurious outputs.

The parameters of the transceiver 302 and modem 304 can be configured to optimize the operation the receiver for the mobile device 108. The channel bandwidth to filtering bandwidth in the RF transceiver 302 should be greater than the channel bandwidth to filtering bandwidth that is implemented in the baseband modem 304 for a desired operating mode. This is so because the narrower bandwidth of the RF transceiver based on using LTE wireless communication technology as compared to the baseband modem using 3GPP2 CDMA would be difficult to compensate for the required response of the mobile device 108. As the delta between the channel bandwidth to filtering bandwidth value increases, the use of the LTE transceiver and the 3GPP2 CDMA modem becomes more difficult. In an embodiment, the value of the channel bandwidth to filtering bandwidth of the transceiver should be close to or approximate the value of the channel bandwidth to the filtering bandwidth of the modem. This will achieve acceptable rejection and blocking performance for in band interferers from adjacent channels and interferers from other systems. Analog filter rejection of the received signals should be provided to a mixer and analog to digital converter of the mobile device 108 to avoid non-linear issues with intermodulation distortion caused by the conversion of the received signal. In addition, digital filtering prior to the downsampling performed by the matching filters should be performed in the RF transceiver 302 to lessen issues with aliasing of residual adjacent channels or other in band interferes prior to the final channel filtering implemented in the baseband modem 304.

The aliasing of residual adjacent channels or other in band interferers is a consideration for the sample rate over the DigRF interface and therefore for the resampling ratio that is implemented in the receiver portion of the baseband modem 302. For example, a 1.92 Msps sample rate over the interface that was resampled according to a 128/25 rate to an 8× chip rate (i.e. 8*1.2288 Msps=9.8304 Msps) needed by the CDMA modem 304 is used. This resampling is implemented using the matching filters 318, 326 that may include a interpolation component that upsamples by a factor of 128 followed by a decimation component that downsamples by a factor of 25.

In addition, the number of bits used for the I/Q data samples over the DigRF interfaces 318, 326 at 1.92 Msps must be larger than the number of bits needed by the baseband modem 304 in order to account for any residual adjacent channel or in band blockers which would be further rejected in the matching filters 336, 340 and the alias filters 338, 342. After the filtering by the modem, the number of bits per I/Q data sample can be reduced to the number used by the modem 302.

It is understood the RF transceiver 302 can provide filtering of the received signals 306, 308. The purpose of this filtering is to provide at least some rejection of adjacent channel and in band interferers so that automatic gain control algorithms in the transceiver do not set the signal level according to the residual interferer level. If the filter performed by the transceiver is not sufficient, a separate automatic gain control (AGC) block and control loop may be implemented after the baseband channel filter prior to the modem. In an embodiment, the transceiver bandwidth and channel filtering can be configured such that sufficient rejection of adjacent channel and in band interferers are achieved so that a separate baseband AGC does not need to be implemented.

The filters in the baseband modem in combination with the channel filter response in the transceiver provide a response that is "matched" to the base station transmit filter response in order to produce zero or negligible inter symbol interference (ISI). The base station filter response is defined by 3GPP2. In an embodiment, the baseband filters provide a compensation for magnitude droop that occur in the transceiver but does not need to provide any phase compensation. Therefore the baseband modem filters can be implemented with symmetrical coefficients to save implementation size and RAM. If the filtering caused by the transceiver is narrow and has a large group delay then phase compensation can be implemented in the baseband modem, which could result in a filter structure with asymmetric coefficients.

For the transmitter of the mobile device, the channel bandwidth to filtering bandwidth value in the transceiver should be greater than the channel bandwidth to filtering bandwidth value implemented in the baseband modem. This is so because the narrower bandwidth of the RF transceiver based on using LTE wireless communication technology as compared to the baseband modem using 3GPP2 CDMA would be difficult to compensate for the required response of the mobile device 108. The channel bandwidth to filtering bandwidth value of the transceiver should also provide rejection for aliases and noise to meet spectral emissions requirements.

The sample rate of the DigRF interfaces 318, 326 are chosen to approximate the nyquist rate and the transceiver provides alias filtering. If the transceiver channel bandwidth to filtering bandwidth is not narrow enough then the sample rate over the interface may be increased. In an embodiment, the modem produces samples at 1× chip rate which must be resampled to 1.92 Msps prior that is provided to the interface 326.

The channel filtering in the baseband modem convolved with the channel filtering response in the transceiver should provide a response that corresponds with pulse shape filtering requirements specified in the 3GPP2 CDMA standard. The channel filter in the base station receiver can then be designed to a combined response of mobile devices transmitter and base stations receiver filters produce negligible ISI. In an embodiment, the baseband modem filter provides a small amount of magnitude compensation for the transceiver, but does not need to provide any phase compensation, which may require asymmetrical coefficients for the baseband modem filtering.

The description above is discussed in the context of a 3GPP2 CDMA modem, but the principles can apply to different modems and different combinations of transceivers and modems where an advantageous interface is used in coupling the two. In the case of a Time Division Synchronous Code Division Multiple Access modem, few changes may be necessary. For example the sample rate conversions, where the TD-SCDMA modem would typically operate at a rate of fc=1.28 MHz for TX and 2*fc=2.56 MHz for RX would be *3/2 for transmitter and *4/3 for the receiver to achieve the desired rate of 1.92 MHz at the LTE RF transceiver. In the case of a Dual Carrier High Speed Downlink Packet Access (DC-HSDPA) modem the necessary changes are also few. For example the sample rate conversions, where the DC-HSDPA modem would typically operate at a rate of fc=7.68 MHz for TX and 2*fc=15.36 MHz for RX would be *2 for transmitter and no change for the receiver to achieve the desired rate of 15.36 MHz at the LTE RF transceiver.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An apparatus comprising:
  a transceiver including a transmitter for transmitting a signal and a receiver for receiving a signal wherein the transceiver using a Long Term Evolution radio frequency (LTE) wireless communication technology and
  a modem coupled to the transceiver wherein the modem processes the signal received from the receiver and processes a transmit signal for the transceiver, wherein the modem using a CDMA wireless communication technology wherein the modem including a first receiver processing circuit and a transmitter processing circuit, the first receiver processing circuit having a matching filter to optimize the signal received from the receiver to be compatible with the modem, wherein the signal received from the receiver is otherwise incompatible with the modem and further wherein the transmitter processing circuit having a filter for adjusting a processed transmit signal for the transmitter.

2. The apparatus of claim 1 wherein the first receiver processing circuit resamples the signal from the receiver to be compatible with the modem and the transmitter processing circuit resamples the processed transmit signal for the transmitter.

3. The apparatus of claim 1 wherein the CDMA baseband modem further comprises a second receiver first processing circuit having a second matching filter to optimize and resample the signal received from the receiver to be compatible with the modem wherein the first receiving processing circuit for processing a main received signal and the second receiver processing circuit for processing a diversity received signal.

4. The apparatus of claim 1 wherein the first matching filter resamples the signal received from the receiver from a rate of 1.92 MHz to 8× chip rate required by the modem.

5. The apparatus of claim 4 wherein the first matching filter comprising an interpolation filter that upsamples by a factor of 128 followed by a decimation filter that downsamples by a factor of 25.

6. The apparatus of claim 1 wherein a channel bandwidth to filtering bandwidth in the transceiver is greater than the channel bandwidth to filtering bandwidth implemented by the modem.

7. The apparatus of claim 6 wherein the channel bandwidth to filtering bandwidth in the transceiver approximates the channel bandwidth to filtering bandwidth implemented by the modem.

8. The apparatus of claim 6 wherein the channel bandwidth to filtering bandwidth in the transceiver provides rejection for at least one of aliases and noise so that the apparatus meets spectral emissions.

9. The apparatus of claim 1 wherein the transceiver further comprises a transceiver interface and the modem further comprises a modem interface, wherein the transceiver interface and the modem interface are compatible and wherein the transceiver interface and the modem interface have a sample rate approximate to the nyquist rate.

10. The apparatus of claim 1 wherein the receiver processing circuit further comprising an aliasing filter to process the received signal from the transceiver for the modem.

11. The apparatus of claim 1 wherein the transmit processing circuit further comprising an aliasing filter to process the transmit signal from the modem for the transceiver.

12. A wireless communication node comprising:
a Long Term Evolution radio frequency (LTE) transceiver including a receiver, a transmitter and an interface and
a CDMA baseband modem including an interface coupled to the interface of the LTE transceiver and wherein the CDMA baseband modem includes a first matching filter coupled between the interface of the CDMA baseband modem and a first receiver processing circuit and pulse shaping filter coupled between the interface of the CDMA baseband modem and a transmitter processing circuit, wherein the matching filter optimizes the signal received from the receiver to be compatible with the CDMA baseband modem, wherein the received signal from the LTE receiver is otherwise incompatible with the CDMA baseband modem and resamples the signal received from the LTE receiver to a rate compatible with the CDMA baseband modem and wherein the pulse shaping filter for resampling and adjusting a processed transmit signal from the CDMA baseband modem for the LTE transmitter.

13. The wireless communication device of claim 12 wherein the CDMA baseband modem further comprises a second matching filter coupled between the interface of the CDMA baseband modem and a second receiver processing circuit wherein the second matching filter compensates for and resamples the signal received from the LTE receiver to be compatible with the CDMA baseband modem wherein the first matching filter processes a main received signal and the second matching filter processes a diversity received signal.

14. The wireless communication device of claim 12 wherein the first matching filter resamples the signal received from the LTE receiver from a rate of 1.92 MHz to 8× chip rate required by the CDMA baseband modem.

15. The wireless communication device of claim 14 wherein the first matching filter comprising an interpolation filter that upsamples by a factor of 128 followed by a decimation filter that downsamples by a factor of 25.

16. The wireless communication device of claim 12 wherein a channel bandwidth to filtering bandwidth in the LTE transceiver is greater than the channel bandwidth to filtering bandwidth implemented by the CDMA baseband modem.

17. The wireless communication device of claim 12 wherein CDMA baseband modem further comprises a modem interface, wherein the transceiver interface and the modem interface are compatible and wherein the transceiver interface and the modem interface have a sample rate approximate to the nyquist rate.

18. The wireless communication device of claim 12 further comprising a first aliasing filter coupled to the first matching circuit and wherein the pulse shaping filter including a second aliasing filter.

19. A method comprising:
receiving a signal by a transceiver wherein the transceiver using a Long Term Evolution radio frequency (LTE) wireless communication technology;
providing the received signal to a modem wherein the modem using a CDMA wireless communication technology and is coupled to the transceiver using an interface;
filtering the signal received by the transceiver to optimize the signal received by the transceiver to be compatible with the modem using the CDMA wireless communication technology, wherein the signal received by the transceiver is otherwise incompatible with the modem, by compensating for filtering of the signal received by the transceiver and resampling the signal received by the transceiver from the rate of the transceiver to the rate of the modem, and
demodulating the signal received by the modem.

20. The method of claim 19 further comprising:
modulating a signal for transmission using the CDMA wireless communication technology;
adjusting the signal for transmission to be optimized from using the CDMA wireless communication technology to be compatible with the LTE wireless communication technology;
providing timing adjustments to the signal for transmission for the CDMA wireless communication technology, and
filtering the signal for transmission to provide pulse shaping for the CDMA wireless communication technology, and providing the signal for transmission for the LTE wireless communication signal to the transceiver using the interface.

\* \* \* \* \*